US012709922B2

(12) United States Patent
Weichsel et al.

(10) Patent No.: US 12,709,922 B2
(45) Date of Patent: Aug. 18, 2026

(54) LOCK HOLDER FOR A MOTOR VEHICLE LOCKING DEVICE

(71) Applicant: KIEKERT AKTIENGESELLSCHAFT, Heiligenhaus (DE)

(72) Inventors: Ulrich Weichsel, Duisburg (DE); Thorsten Bendel, Oberhausen (DE); Tobias Klocke, Mettmann (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 31 days.

(21) Appl. No.: 18/852,727

(22) PCT Filed: Mar. 23, 2023

(86) PCT No.: PCT/DE2023/100224

§ 371 (c)(1),
(2) Date: Sep. 30, 2024

(87) PCT Pub. No.: WO2023/193845

PCT Pub. Date: Oct. 12, 2023

(65) Prior Publication Data

US 2025/0223850 A1 Jul. 10, 2025

(30) Foreign Application Priority Data

Apr. 7, 2022 (DE) ..................... 10 2022 108 376.4

(51) Int. Cl.
*E05B 85/04* (2014.01)

(52) U.S. Cl.
CPC .................................. *E05B 85/045* (2013.01)

(58) Field of Classification Search
CPC ............................... E05B 85/04; E05B 85/045
(Continued)

(56) References Cited

U.S. PATENT DOCUMENTS 7,344,169 B2 * 3/2008 Han ...................... E05B 85/045 292/341.12
8,128,138 B2 * 3/2012 Bambenek ............ E05B 85/045 292/340
(Continued)

FOREIGN PATENT DOCUMENTS

DE 60114107 T2 7/2006
DE 102018125535 A1 4/2020
(Continued)

OTHER PUBLICATIONS

International Search Report mailed Jun. 27, 2023, for priority International Application No. PCT/DE2023/100224.

*Primary Examiner* — Nathan Cumar
(74) *Attorney, Agent, or Firm* — Renner, Otto, Boisselle & Sklar, LLP

(57) ABSTRACT

A lock holder is provided for a motor vehicle locking device, in particular a motor vehicle lock and preferably a motor vehicle door lock. In its basic form, the lock holder is provided with a base plate and a shackle standing on same. The shackle has at least two bolts and a connecting piece connecting the two bolts on the upper side. In addition, an additional reinforcing plate is provided through which the two bolts extend and which is arranged at least on parts of the surface of the base plate. According to the invention, the reinforcing plate extends over a bead of the base plate connecting the two bolts to one another.

12 Claims, 1 Drawing Sheet

(58) Field of Classification Search
USPC .......................................................... 292/340
See application file for complete search history.

(56) References Cited

U.S. PATENT DOCUMENTS 8,439,409 B2 * 5/2013 Uto ........................... E05C 3/24 292/216
8,727,403 B2 * 5/2014 Johnson .................. E05B 77/38 292/DIG. 55
2011/0025078 A1 * 2/2011 Gentile ................... E05B 77/38 292/341.12
2012/0306237 A1 * 12/2012 Farooq .................... E05B 83/24 296/193.11
2013/0285395 A1 * 10/2013 Burciaga ................. E05B 77/38 292/340
2014/0159393 A1 * 6/2014 Heo ........................ E05B 79/02 292/340
2015/0218849 A1 * 8/2015 Waldmann ............ E05B 85/045 72/352
2015/0322700 A1 * 11/2015 Muramatsu ........... E05B 85/045 292/170
2018/0305959 A1 * 10/2018 Abbott ................... B60J 5/0479
2018/0320418 A1 * 11/2018 Berghahn ................ E05B 83/18
2021/0246687 A1 * 8/2021 Digel ..................... B62D 25/12
2021/0254373 A1 * 8/2021 Suzaki ................... B60J 5/0433

FOREIGN PATENT DOCUMENTS

EP 2562339 B1 8/2018
JP H0399159 U 10/1991
JP 2547515 Y2 * 9/1997

* cited by examiner

LOCK HOLDER FOR A MOTOR VEHICLE LOCKING DEVICE

This application is a national phase of International Patent Application No. PCT/DE2023/100224 filed Mar. 23, 2023, which claims priority to German Patent Application No. 10 2022 108 376.4 filed Apr. 7, 2022, each of which is hereby incorporated herein by reference in its entirety.

FIELD OF DISCLOSURE

The invention relates to a lock holder for a motor vehicle locking device, in particular a motor vehicle lock, preferably a motor vehicle door lock, comprising a base plate and a shackle standing on same, wherein the shackle has at least two bolts and a connecting piece connecting the two bolts on the upper side, and wherein an additional reinforcing plate is provided through which the two bolts extend and which is arranged at least on parts of the surface of the base plate.

BACKGROUND OF THE DISCLOSURE

Lock holders for motor vehicle locking devices are typically installed on the body side and connected, for example, to a B-pillar of a motor vehicle body or a C-pillar. As a rule, a locking mechanism consisting of a catch and a pawl as part of the motor vehicle locking device interacts with the lock holder in question and is located on the door or hatch side for this purpose. In principle, the motor vehicle locking device can also be designed as a seat lock. In this case, the locking mechanism is found on a motor vehicle seat, whereas the lock holder is connected to the motor vehicle body or a boom.

In particular in the case of motor vehicle locks and preferably motor vehicle door locks, the motor vehicle locking device and specifically the locking mechanism in conjunction with the lock holder must absorb considerable tearing forces in connection with crash scenarios. In fact, in the event of a crash, the locking mechanism that surrounds the lock holder or the catch equipped with the pawl prevents an associated motor vehicle door from springing open in the event of an accident. This provides optimal protection for the occupants inside. At the same time, this procedure ensures that safety devices such as side airbags, impact protection, etc. located for example in the motor vehicle door in question, are effective.

For this reason, the design of both the locking mechanism consisting of the catch and pawl as well as the lock holder is of particular importance, taking safety aspects into account. This is expressed, for example, by the fact that high-strength steels are predominantly used as materials at this point. In addition, there are numerous approaches in the prior art to prevent the shackle from tearing off from the base plate in such a lock holder, in particular in the event of a crash.

For example, the generic prior art according to DE 601 14 107 T2 proceeds in such a way that an additional plate is provided which partially covers a lock holder described therein. With the aid of the plate in question, the lock holder is to be prevented from moving along a direction Ox, that is, in the direction of the two bolts. Ultimately, the aim here is to simplify the installation and position adjustment of a corresponding locking plate of the lock.

Another lock holder is described in DE 10 2018 125 535 A1, which, however, does not have an additional reinforcing plate. EP 2 562 339 B1 relates to a wedge device in a lock holder which interacts with springs.

The prior art has proven itself in principle, but still offers room for further improvement. Because of the increasing weight of motor vehicles and thus also the increasing weight of motor vehicle doors and vehicle hatches, in the event of an accident or crash it can be expected that the tearing forces acting on the body-side lock holder will also increase, which can be explained by the inertial forces acting on the door or hatch in question. Attempts have been made to take this into account by using new materials, but this increases the costs of such lock holders. The invention as a whole seeks to remedy this.

SUMMARY OF DISCLOSURE

The invention is based on the technical problem of further developing such a lock holder for a motor vehicle locking device in such a way that, taking into account a structurally simple and functional form, a further increase in the tearing forces that can be absorbed is observed.

To solve this technical problem, a generic lock holder for a motor vehicle locking device is characterized within the scope of the invention in that the reinforcing plate extends over a bead of the base plate connecting the two bolts to one another.

In this context, it has proven particularly effective if the bead connects the two bolts of the shackle with one another and is curved upwards towards the shackles opposite the base plate. In addition, the design is usually such that the reinforcing plate is T-shaped when viewed from above with a T-connecting piece connecting the two bolts and a front-side T-leg. The T-connecting piece and the T-leg of the reinforcing plate typically have a total length that corresponds to the maximum length of the bead. This means that the total length of the reinforcing plate consisting of the T-leg and the T-connecting piece corresponds to a maximum of the total length of the bead.

In this way, the design is first of all such that the bead connects the two bolts to one another. The invention is based on the knowledge that tearing forces acting on the lock holder generally act on the lock holder or the shackle of the lock holder in a plane spanned by the two bolts. As a result, when a bolt is torn off, one or both bolts are sheared off from the base plate holding them or are torn out of the base plate. This usually applies to the rear bolt on the lock holder when viewed from the front. The invention is based on the knowledge that the front bolt when viewed from the front is generally surrounded by the catch, so that when tearing forces are applied, the rear bolt in particular, which is not surrounded by the catch, is subjected to high tensile forces, which in the event of a tearing off lead to the bolt being sheared off or simply torn out of the base plate.

In order to set the forces required for this, if possible to a maximum, or to increase them compared to the prior art, the invention relies substantially on two aspects. First of all, the bead connecting the two bolts to one another provides additional stiffening of the base plate and also of the connection between the two bolts as well as the coupling between the bolt and the base plate. In addition, the additional reinforcing plate provided according to the invention additionally stiffens this connection region between the two bolts. This can be attributed to the fact that the tearing forces acting on the lock holder generally act along a plane connecting the two bolts. According to the invention, the bead and the reinforcing plate now interact exactly in the direction of this plane as a connection between the two bolts, so that in this way the tearing forces absorbed by the lock holder according to the invention can be significantly increased compared to the prior art. These are the main advantages.

According to a further advantageous embodiment, the design is such that the front-side T-leg of the reinforcing plate has arms which overlap the bead on the base plate. The two arms are each formed at an angle when viewed from the front. In fact, the two angled arms generally have a plate connecting piece connected to the reinforcing plate on the one hand and a bead connecting piece adapted to a material thickness of the bead and connected at an angle to the plate connecting piece on the other hand. It has proven to be particularly advantageous if the bead connecting piece is connected to the plate connecting piece at a right angle. In addition, the two bead connecting pieces generally have a distance adapted to the width of the bead.

This ensures that the reinforcing plate can be perfectly coupled to the bead connecting the two bolts. The two bead connecting pieces ensure that the reinforcing plate is centered relative to the bead. This is further enhanced by the fact that the two bolts extend through the reinforcing plate.

In addition, the design of the reinforcing plate in the advantageous T-shape ensures that the reinforcing plate can be manufactured easily and cost-effectively. The reinforcing plate can usually be produced by a combined punching/bending process. The punching process defines both the T-leg and the T-connecting piece. Afterwards, it is only necessary to bend the bead connecting piece at a right angle to the plate connecting piece. This requires an additional bending process. In principle, however, the punching and bending processes can also be carried out in one go, so that the production costs for the T-shaped reinforcing plate according to the invention can be kept low.

This also applies if, for example, hardened or high-strength steel is used as the material for the reinforcing plate, as is the case for the base plate and the bolt of the lock holder as well as for the locking mechanism.

As a further advantageous embodiment, the invention recommends that the two bead connecting pieces and the bead are each axially symmetrical in comparison to a plane of symmetry passing through the two bolts of the shackle. As already explained at the outset, tearing forces typically act on the lock holder according to the invention in or along this plane of symmetry. The symmetrical design ensures that these tearing forces can be optimally and uniformly absorbed by the lock holder.

From a manufacturing point of view, it has proven to be effective if the two bolts of the shackle with the reinforcing plate attached are or will be anchored in the corresponding shackle openings of the base plate. The bolts of the shackle can be anchored in the base plate, for example, by riveting the ends of the respective bolts to the base plate. Alternatively or additionally, the bolts can also be welded to the base plate. Because the two bead connecting pieces advantageously have a distance from one another adapted to the width of the bead, any tilting of the reinforcing plate is not observed when tearing forces are applied, but rather the reinforcing plate performs its original function, namely to reinforce and stiffen the lock holder in the direction of a plane connecting the two bolts, because the tearing forces acting on the lock holder in the event of a crash usually act on the lock holder in or along this plane.

The result is a lock holder that is able to absorb even greater tearing forces compared to the prior art, in particular in the event of an accident or crash. All this is achieved by using an additional reinforcing plate, which can be manufactured inexpensively and combined with the bolts of the shackle and the base plate. These are the main advantages.

BRIEF DESCRIPTION OF DRAWINGS

In the following, the invention is explained in more detail with the aid of a drawing showing only an exemplary embodiment; in the figures.

DETAILED DESCRIPTION

The figures show a lock holder for a motor vehicle locking device and, in particular, a motor vehicle lock. Specifically, it is a lock holder for a motor vehicle door lock. For this purpose, the motor vehicle door lock in question is usually installed in or on a motor vehicle door (not shown). The lock holder, on the other hand, is located on the body side. It can be seen that, in its basic form, the lock holder is provided with a base plate 1 and a shackle 2 standing on same.

The shackle 2 has at least two bolts 2_a_, 2_b_. The two bolts 2_a_, 2_b_ are divided into a front-side bolt 2_a_ and a rear bolt 2_b_. The front-side bolt 2_a_ is usually surrounded by a catch (not shown) as part of a locking mechanism of the motor vehicle locking device. The two bolts 2_a_, 2_b_ are connected to one another on the upper side with the aid of a connecting piece 2_c_. According to the exemplary embodiment, the two bolts 2_a_, 2_b_ and the connecting piece 2_c_ are formed as a single piece.

In addition, a supplementary reinforcing plate 3 is realized through which the two bolts 2_a_, 2_b_ extend. The reinforcing plate 3 rests at least on parts of the surface on the base plate 1 of the lock holder, thus covering the surface of the base plate 1 partially or completely. According to the invention, the design is such that the reinforcing plate 3 extends over a bead 1_a_ of the base plate 1 connecting the two bolts 2_a_, 2_b_ to one another. The bead 1_a_ of the base plate 1 extends in the direction of the two bolts 2_a_, 2_b_, over the entire length of the base plate 1 between two fastening openings 4, with the aid of which the base plate 1 is fastened to the body. The two bolts 2_a_, 2_b_ are connected to one another by the bead 1_a_ of the base plate 1.

Figure 1:
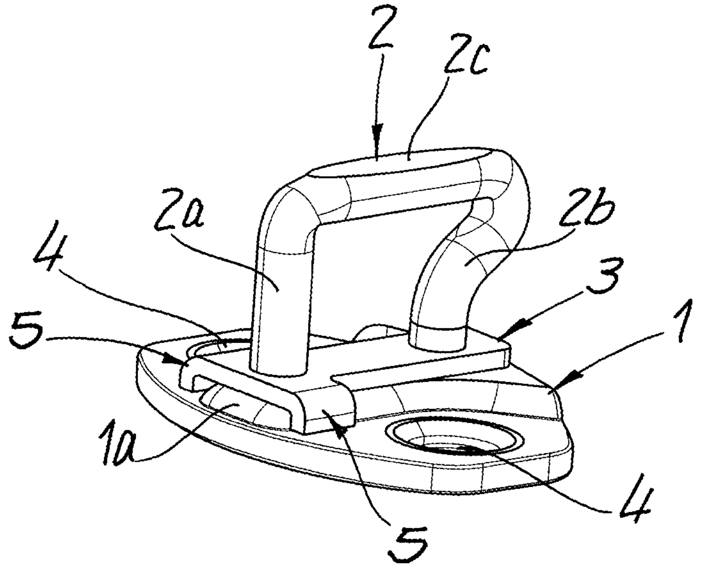
FIGS. 1 and 2 are an overview and a detailed view of the lock holder according to the invention.
Figure 2:
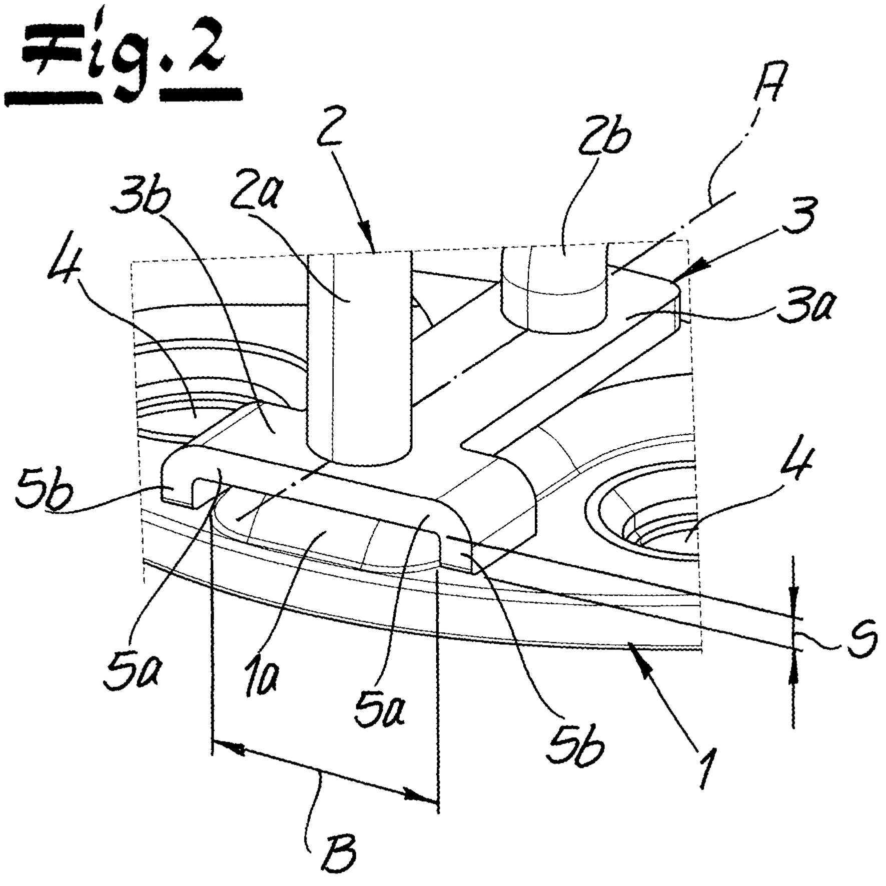

When comparing FIGS. 1 and 2, it can be seen that the reinforcing plate 3 is T-shaped when viewed from above. In fact, the reinforcing plate 3 consists of a T-connecting piece 3_a_ connecting the two bolts 2_a_, 2_b_ and a front-side T-leg 3_b_. The T-leg 3_b_ is connected at right angles to the T-connecting piece 3_a_. It can also be seen that substantially the two bolts 2_a_, 2_b_ are connected to one another with the aid of the T-connecting piece 3_a_.

The T-connecting piece 3_a_ and the T-leg 3_b_ together have a total length which corresponds to that of the bead 1_a_ at the maximum. This means that the bead 1_a_ on the base plate 1 is generally somewhat larger or longer in length than the total length of the T-connecting piece 3_a_ including the front-side T-leg 3_b_.

The front-side T-leg 3_b_ is equipped with two arms 5 that span the bead 1_a_ on the base plate 1. It can be seen that the two arms 5 are each at an angle when viewed from the front. In fact, the two arms 5 are each composed of a plate connecting piece 5_a_ connected to the reinforcing plate 3 and, in addition, a bead connecting piece 5_b_ adapted to a material thickness S of the bead 1_a_ and connected at an angle to the plate connecting piece 5_a_. This means that the length of the bead connecting piece 5_b_ corresponds substantially to the material thickness S of the bead 1*a*, as can be seen in particular from the detailed illustration in FIG. 2.

The bead connecting piece 5*b* of the arm 5 is connected at right angles to the plate connecting piece 5*a*. In addition, the design is such that the two bead connecting pieces 5*b* have a distance from one another adapted to a width B of the bead 1*a*. In this way, the bead 1*a* is largely positively accommodated between the two bead connecting pieces 5*b* and thus the two arms 5 on the reinforcing plate 3 and the two arms 5 ensure that the reinforcing plate 3 is centered relative to the bead 1*a*. This is further enhanced by the fact that the two bolts 2*a*, 2*b* pass through corresponding openings in the reinforcing plate 3.

The two bead connecting pieces 5*b* as well as the bead 1*a* are each axially symmetrical in comparison to an axis of symmetry or plane of symmetry A passing through the two bolts 2*a*, 2*b* of the shackle 2. This also applies to the reinforcing plate 3 and the base plate 1 of the lock holder. This symmetrical design ensures that any tearing forces acting on the lock holder in the direction of this plane of symmetry A are absorbed symmetrically and introduced into the body via screws or other fastening means which pass through the fastening openings 4. At the same time, this design ensures that the rear bolt 2*b* in particular is not torn out of the base plate 1 in the event of any tearing forces acting on the lock holder.

The reinforcing plate 3 can be manufactured as a combined stamped/bent part made of a typically high-strength steel. In addition, the design is then usually such that the two bolts 2*a*, 2*b* of the shackle with the reinforcing plate 3 attached on or to the bolts 2*a*, 2*b* engage in corresponding shackle openings of the base plate 1 (not shown in the figures) and are anchored in these shackle openings. In fact, according to the exemplary embodiment, these shackle openings are located in the bead 1 and are therefore additionally stiffened by the bead 1. To couple the respective bolts 2*a*, 2*b* in the shackle openings to the base plate, conventional fastening methods can be used, for example the bolts 2*a*, 2*b* can be riveted in the base plate 1 and/or welded to the base plate 1.

LIST OF REFERENCE SIGNS

Base plate 1
Bead 1*a*
Shackle 2
Bolts 2*a*, 2*b*
Connecting piece 2*c*
Reinforcing plate 3
T-connecting piece 3*a*
T-leg 3*b*
Fastening openings 4
Arms 5
Plate connecting piece 5*a*
Bead connecting pieces 5*b*
Plane of symmetry A
Width B
Material thickness S

The invention claimed is:

1. A lock holder for a motor vehicle locking device comprising:
- a base plate and a shackle standing on the base plate, wherein the shackle has at least two bolts and a connecting piece connecting the two bolts on an upper side of the shackle, and
- a reinforcing plate through which the two bolts extend and which is arranged at least on parts of a surface of the base plate,
- wherein the reinforcing plate extends over a bead of the base plate and connects the two bolts to one another, and
- wherein the two bolts are each directly attached to the reinforcing plate.

2. The lock holder according to claim 1, wherein the bead connects the two bolts to one another.

3. The lock holder according to claim 1, wherein, when viewed from above, the reinforcing plate is T-shaped with a T-connecting piece connecting the two bolts to one another and a front-side T-leg.

4. The lock holder according to claim 3, wherein the T-connecting piece and the T-leg have a total length which corresponds at most to a length of the bead.

5. The lock holder according to claim 3 wherein the front-side T-leg has two arms which extend over the bead on the base plate.

6. The lock holder according to claim 5, wherein each of the two arms includes a plate connecting piece connected to the reinforcing plate and a bead connecting piece, and wherein, when viewed from a front side, the two arms are each formed at an angle with the plate connecting piece connected to the reinforcing plate, and the bead connecting pieces of each of the two arms are adapted to a material thickness of the bead and connected at an angle to the plate connecting piece.

7. The lock holder according to claim 6, wherein the bead connecting pieces are connected at right angles to the plate connecting piece.

8. The lock holder according to claim 6, wherein the bead connecting pieces of each of the two arms have a distance from one another adapted to a width of the bead.

9. The lock holder according to claim 6, wherein the bead connecting pieces of each of the two arms and the bead are each axially symmetrical in comparison to a plane of symmetry passing through the two bolts of the shackle.

10. The lock holder according to claim 1, wherein the two bolts of the shackle with attached reinforcing plate are anchored in associated shackle openings of the base plate.

11. The lock holder according to claim 10, wherein the two bolts of the shackle are anchored by at least one of riveting or welding.

12. The lock holder according to claim 1, wherein the bead extends over an entire length of the base plate between fastening openings in the base plate.

* * * * *